Patented Mar. 17, 1925.

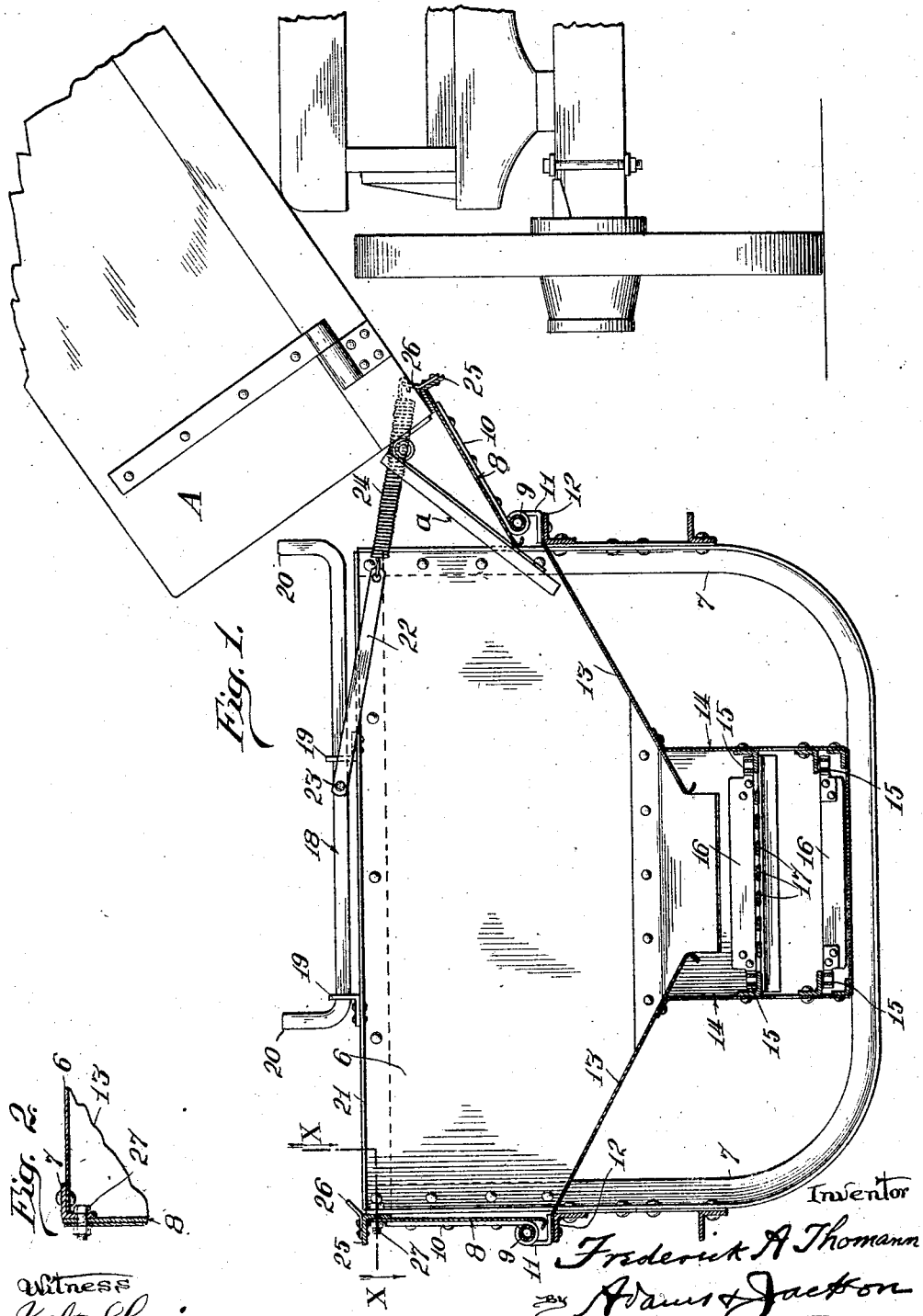

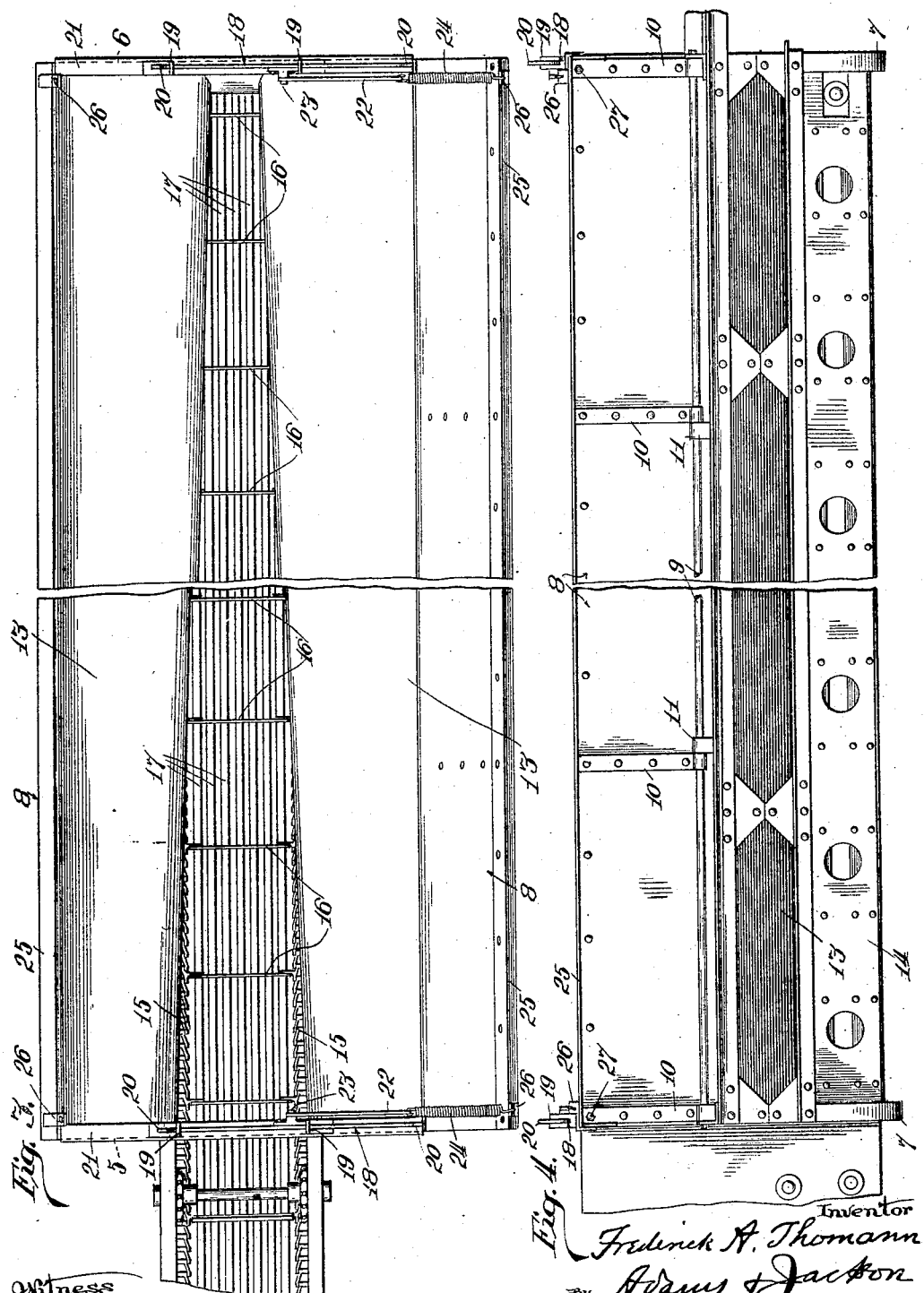

1,529,674

UNITED STATES PATENT OFFICE.

FREDERICK A. THOMANN, OF EAST MOLINE, ILLINOIS, ASSIGNOR TO DEERE & COMPANY, OF MOLINE, ILLINOIS, A CORPORATION OF ILLINOIS.

HOPPER.

Application filed June 29, 1923. Serial No. 648,468.

*To all whom it may concern:*

Be it known that I, FREDERICK A. THOMANN, a citizen of the United States, and a resident of East Moline, in the county of Rock Island and State of Illinois, have invented certain new and useful Improvements in Hoppers, of which the following is a specification, reference being had to the accompanying drawings.

It is common practice to move wagon loads of sugar beets to a point adjacent to a railroad where they are dumped from the wagons directly into a long receptacle or hopper in which is arranged an endless conveyor that carries the beets to and discharges them into an elevating device that delivers them directly into cars or upon the ground in a large pile. Such dumping of the beets from wagons is ordinarily accomplished by means of a hoisting mechanism that so lifts and tilts the wagon body as to discharge the beets therefrom over the side wall of the hopper,—the downwardly-turned hinged side or end gate of the wagon acting as a chute to direct the beets into the hopper. It is the object of my invention to so construct a hopper that either of its side walls may be readily turned down and held at all times during the discharge of beets from the wagon to the hopper in contact with the turned gate or wall of the wagon and by its inclination and its relation to such wagon gate or wall cooperate therewith to form a more perfect chute than would be afforded solely by the gate or wall of the wagon. It is a further object of the invention to provide the hopper with means that are adapted for use alternatively with its opposite hinged side walls for holding them in said cooperative relation with a dumping wagon, the opposite side wall of the hopper at such time remaining in locked vertical position. These objects are attained by the means shown in the drawings and hereinafter particularly described. That which I believe to be new will be set forth in the claims.

In the drawings,

Fig. 1 is a vertical cross-section through a hopper embodying my improvements, one of the hinged side walls thereof being in lowered position and shown in co-operating relation to the down-turned gate or wall of a wagon, a portion of the body of such wagon being shown in dumping position;

Fig. 2 is a detail, being a horizontal section taken at line *x—x* of Fig. 1;

Fig. 3 is a top or plan view of the hopper shown in Fig. 1 with the hinged side walls thereof in the positions respectively occupied by them in Fig. 1, a portion of the hopper being broken away; and Fig. 4 is a side elevation of the hopper, a portion being broken away, the hinged side wall that is shown being in vertical or closed position.

Referring to the several figures of the drawings, 5 and 6 indicate, respectively, the opposite end walls of a long hopper into which beets are adapted to be dumped, such hopper in the construction shown being supported at each end by means of two heavy substantially U-shaped frame members 7, preferably formed of angle iron and riveted to said end walls. The side walls of the hopper are indicated by 8, and near its lower edge each wall is hingedly connected in place, such hinged connection being effected, as here shown, by the passing of a pipe or rod 9 through eyes formed by turning the lower ends of heavy straps 10 riveted to the outer face of the wall, and also through eyes formed in brackets 11 that rise from and are riveted to a bar 12 that extends the length of the hopper and is riveted to or otherwise secured to the frame members 7. Inclining downwardly from a point immediately adjacent to the lower marginal portion of each hinged wall member 8 is a deflecting plate 13, which plates are adapted to direct beets that are dumped into the hopper into a trough-like member 14 that constitutes the bottom portion of the hopper, and in which is located an endless conveyor device comprising chains 15 that are connected at intervals by cross-strips 16, such cross-strips being movable over a slatted raised partition 17 and acting to move beets along such slatted partition, as will be understood. Inasmuch as the hopper may vary in many details from that shown, so far as concerns the means for guiding and moving the beets into position after they have entered the hopper, it is not believed necessary to enter into a description of the construction and operation of such parts. My present invention has more particularly to do with the hinged side walls and the manner of holding them in position to cooperate with a dump wagon.

Over the upper marginal portion of each of the end walls of the hopper is located a transversely sliding bar 18 that is guided and held by two brackets 19 through apertures in which the bar passes, the end portions of such bar being upturned as at 20 serving not only as convenient hand holds, but which act also to prevent disengagement of the bar from its brackets. The edge portions of the end walls will preferably be reinforced by angle irons 21, as shown, and upon the horizontal flange of each of these will be seated and riveted the holding and guiding brackets 19. At 22 is shown a link that is pivoted at 23 to the bar 18, and at its other end is suitably connected a strong coiled spring 24 that at its outer end is adapted to be connected to the upper portion of one of the hinged side walls 8. In the construction shown the upper marginal portion of each gate is reinforced by an angle iron 25 to which, near each end thereof, is riveted an ear 26 having a hole therethrough with which a hook formed on the end of one of the springs 24 can engage.

When the hopper is not being used to receive beets, the hinged walls 8 will ordinarily be kept in vertical position and may be secured in such position by means of bolts passed through the end portions of their angle iron bars 25 and one of the flanges of each of the angle iron frame members 7, one of such bolts being shown and indicated by 27. When, however, a load of beets is to be dumped into the hopper, that one of the gates at that side of the hopper that is to receive the beets is to be unlocked or unbolted and allowed to swing outward, as indicated in Fig. 1, the weight of the door tending to draw to the limit of its movement in that direction the sliding bars 18. When a loaded wagon is driven alongside of the hopper adjacent to that out-turned wall the side gate of the wagon will be allowed to drop and strike and rest against such wall 8 and, by reason of the provision of the springs 24, will yieldingly support such wagon gate after the manner shown in Fig. 1, where a portion of a tilted wagon body A is shown with its pivoted gate a resting against the inner face of the hopper wall 8 and, as there shown, such wall cooperates with the wagon gate a in forming a chute over which the beets travel from the wagon body to the interior of the hopper.

By providing the transversely sliding bars 18 at each end of the hopper, and by so locating the supporting brackets 19 in which said bars slide at equal distances from the transverse center of the hopper, it is evident that it is only necessary to provide at each end of the hopper a single connection such as that formed by each link 22 and its spring 24, because the two spring members 24 can be hooked onto that one of the walls 8 which is to be turned down to cooperate with the gate of a dump wagon—the hinged wall at the other side of the hopper remaining locked in place. The bars 18 slide readily toward either side of the hopper, as required, and will be stopped at the required position by one of the upturned ends 20, so that the then downturned side wall will stand at a suitable angle to be engaged by the dropped side gate of the wagon, and such dropped gate will be yieldingly supported by reason of the springs 24.

By the use of my improvements the hinged gate of a dump wagon can be positioned at a sharper incline than if it extended over a rigid side wall of a hopper, which sharply inclined position of course facilitates the rapid discharge of the load into the hopper.

What I claim as my invention and desire to secure by Letters Patent, is—

1. The combination of a hopper having a downwardly and outwardly swinging wall, yielding means for sustaining said wall in an inclined position to adapt it to support and cooperate with another member that rests thereon during the discharging of materials over such other member and said wall into the hopper, and means carried by said hopper and movable toward and from said wall for supporting said yielding means in operative position.

2. The combination of a hopper having oppositely-located downwardly and outwardly swinging walls each adapted to be held in an inclined position to support and cooperate with another member that rests thereon during the discharging of materials over it and such other member into the hopper, and means connected with the hopper for alternatively sustaining said walls in such inclined operative position.

3. The combination of a hopper having oppositely-located downwardly and outwardly swinging walls each adapted to be held in an inclined position to support and cooperate with another member that rests thereon during the discharging of materials over it and such other member into the hopper, and yielding means connected with the hopper for alternatively sustaining said walls in such inclined operative position.

4. The combination of a hopper having oppositely-located downwardly and outwardly swinging walls each adapted to be held in an inclined position to support and cooperate with another member that rests thereon during the discharging of materials over it and such other member into the hopper, and means for alternatively sustaining said walls in their inclined operative position comprising a device connected with the hopper and adjustable toward and from either of said walls.

5. The combination of a hopper having oppositely-located downwardly and outwardly swinging side walls, a bar slidingly connected with an end wall of the hopper to adapt it to be moved toward or from either of said side walls, and means connected with said bar for connecting it with either of said side walls to sustain the side wall so connected in an inclined position to adapt it to support and cooperate with another member that rests thereon during the discharging of materials over it and such other member into the hopper.

6. The combination of a hopper having oppositely-located downwardly and outwardly swinging side walls, a bar slidingly connected with an end wall of the hopper to adapt it to be moved toward or from either of said side walls, and means connected with said bar for connecting it with either of said side walls to sustain the side wall so connected in an inclined position to adapt it to support and cooperate with another member that rests thereon during the discharging of materials over it and such other member into the hopper, said connecting means comprising a coiled spring.

FREDERICK A. THOMANN.